United States Patent
Fujii et al.

(10) Patent No.: US 9,243,706 B2
(45) Date of Patent: Jan. 26, 2016

(54) MANUAL TRANSMISSION CLUTCH CONTROL USING MEASURED TORQUE

(71) Applicant: FORD GLOBAL TECHNOLOGIES, LLC, Dearborn, MI (US)

(72) Inventors: Yuji Fujii, Ann Arbor, MI (US); Alex O'Connor Gibson, Ann Arbor, MI (US); Gregory M. Pietron, Canton, MI (US); Nimrod Kapas, Canton, MI (US); Joseph F. Kucharski, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 135 days.

(21) Appl. No.: 14/168,045

(22) Filed: Jan. 30, 2014

(65) Prior Publication Data

US 2015/0211625 A1 Jul. 30, 2015

(51) Int. Cl.
*B60W 10/02* (2006.01)
*B60W 20/00* (2006.01)
*F16H 59/02* (2006.01)

(52) U.S. Cl.
CPC .............. *F16H 59/02* (2013.01); *B60W 10/02* (2013.01); *B60W 20/40* (2013.01); *Y10T 74/2014* (2015.01)

(58) Field of Classification Search
CPC ..... B60W 10/02; B60W 20/40; Y10T 477/26
See application file for complete search history.

(56) References Cited

U.S. PATENT DOCUMENTS

| | | | |
|---|---|---|---|
| 4,648,290 A | 3/1987 | Dunkley et al. | |
| 5,002,170 A | 3/1991 | Parsons et al. | |
| 5,206,805 A * | 4/1993 | Petzold et al. | 701/67 |
| 5,571,059 A | 11/1996 | Desautels et al. | |
| 5,871,419 A | 2/1999 | Amendt | |
| 6,001,044 A | 12/1999 | Amendt | |
| 6,364,809 B1 | 4/2002 | Cherry | |
| 7,182,710 B2 | 2/2007 | Surampudi | |
| 7,228,216 B2 | 6/2007 | Inoue | |
| 7,300,381 B2 | 11/2007 | Badillo et al. | |
| 7,473,209 B2 | 1/2009 | Todd et al. | |
| 2007/0265137 A1* | 11/2007 | Jiang | 477/176 |
| 2008/0064567 A1 | 3/2008 | Kue et al. | |
| 2009/0186743 A1* | 7/2009 | Fodor et al. | 477/86 |
| 2011/0307153 A1 | 12/2011 | Razaznejad et al. | |
| 2011/0320077 A1* | 12/2011 | Choi | 701/22 |
| 2014/0081559 A1* | 3/2014 | Kar | 701/110 |

* cited by examiner

*Primary Examiner* — Tisha Lewis
(74) *Attorney, Agent, or Firm* — James Dottavio; MacMillan, Sobanski & Todd, LLC

(57) ABSTRACT

A method for controlling a manual transmission includes using a controller to determine a desired torque transmitted through an input clutch and a desired clutch slip for the desired gear after a shift lever is moved to a desired gear position and while a clutch pedal is being released for engaging the clutch; measuring torque in the vehicle drive assembly; using measured torque to determine actual clutch torque transmitted through the clutch; and reducing torque error using the controller to adjust a clutch actuator such that a difference between the desired torque and the actual torque is reduced. Slip error may also be reduced by adjusting the clutch actuator to reduce the difference between the desired slip and measured slip.

17 Claims, 5 Drawing Sheets

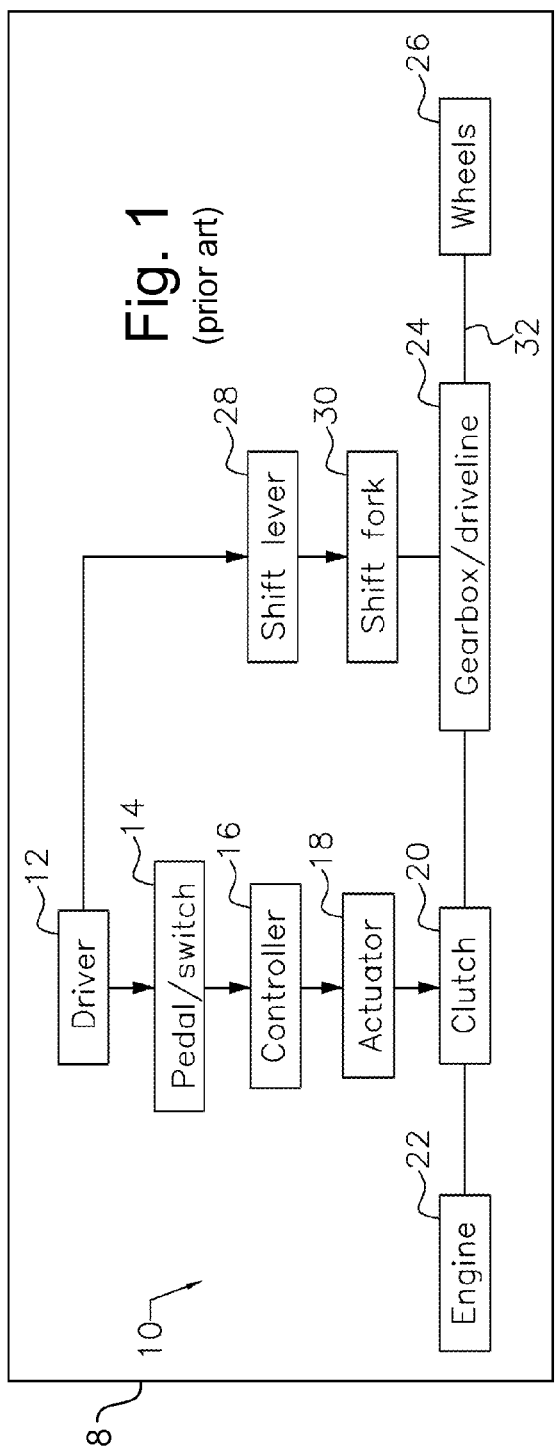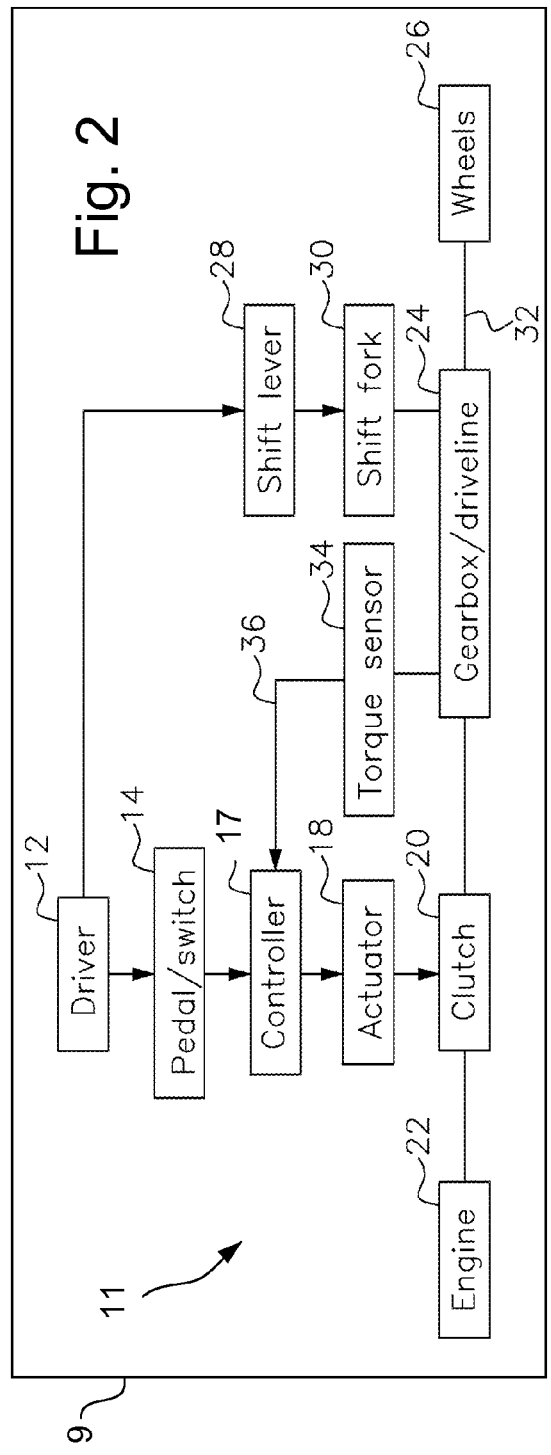

MANUAL TRANSMISSION CLUTCH CONTROL USING MEASURED TORQUE

BACKGROUND OF INVENTION

This invention relates generally to a method for controlling an input clutch of a manual transmission on the basis of direct, real-time torque measurements inside the transmission or in a vehicle driveline.

The market share of vehicles equipped with manual transmissions remains low in this country partly due to operating complexity involved in the gear shifting process. A typical manual transmission system requires a coordinated use of feet to operate the transmission input clutch and throttle pedals while moving a shift fork through a hand-operated shift lever. It also requires a foot-based control to slip the clutch for driving a vehicle at a low speed.

Missed clutch release timing, poor clutch slip control or missed engagement timing results in a stalled engine or undesirable noise, vibration and harshness (NVH) such as clutch shudder.

A robotized manual transmission system with electronically-controlled input clutch has been in use for limited production applications. Its clutch control primarily relies on clutch actuator position and slip speed measurements during clutch release, slip and engagement processes. However, these measurements cannot be directly utilized to accurately compute torque transmitted through the slipping input clutch. More specifically, there is no reliable method to accurately estimate clutch torque based on clutch actuator position and slip speed under all drive conditions because of limited understanding of dry clutch friction mechanisms. Accordingly, a conventional controller of the robotized manual transmission system is not designed to directly observe and use clutch torque in order to detect undesirable NVH behaviors and take corrective closed-loop actions in real-time during clutch release, slip and engagement processes.

SUMMARY OF INVENTION

A method for controlling a manual transmission gearshift may include using a controller to determine a desired clutch torque transmitted through a transmission input clutch for a desired gear after a shift lever is moved to a desired gear position and while a clutch pedal is being released; measuring torque in a vehicle drive assembly; using the measured torque to determine actual torque transmitted through the clutch as the clutch slips; and reducing clutch torque error using the controller to adjust a clutch actuator such that a difference between the desired clutch torque and the actual clutch torque is reduced.

A method to control an electronically-controlled clutch for a vehicle equipped with a manual transmission is provided. The control method can be applied (i) to assist a driver to manually operate the input clutch and a shift lever of a manual transmission for smoother, stall-free clutch operations by correcting undesirable clutch performance based on torque sensing; and (ii) to enable a driver to shift gears by manually moving a shift lever without directly operating a clutch.

The method reduces or eliminates engine stall and undesirable NVH occurrences such as clutch shudder.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

BRIEF DESCRIPTION OF DRAWINGS

The invention will be more readily understood by reference to the following description, taken with the accompanying drawings, in which:

FIG. 1 is a schematic diagram showing a manual transmission system with electronically-actuated clutch system, according to a prior art design;

FIG. 2 is schematic diagram showing a manual transmission system having an electronically-actuated clutch system and torque sensor;

DETAILED DESCRIPTION

Figure 3:
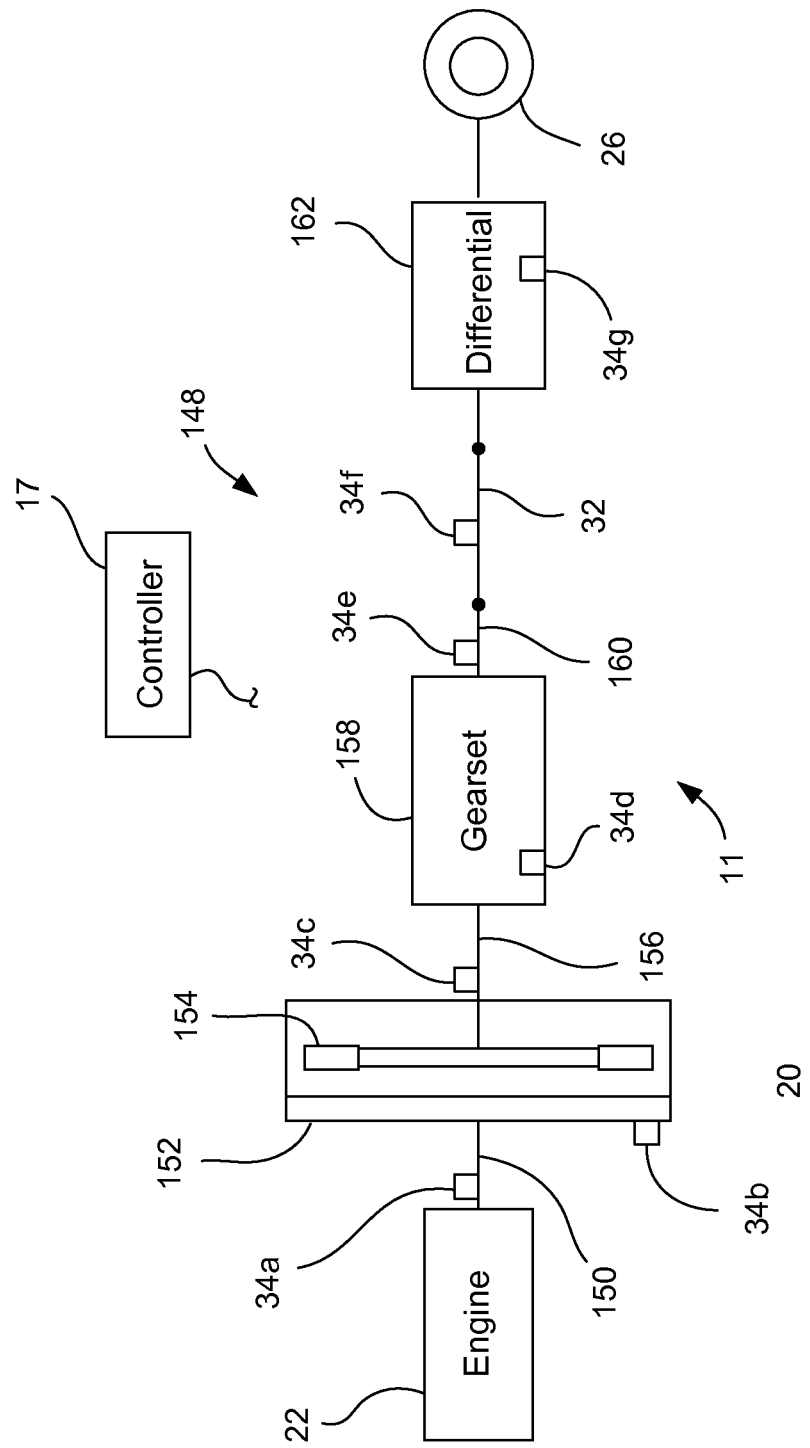
FIG. 3 is a schematic diagram of a vehicle drive assembly and locations where the torque sensor may be located.

FIG. 1 shows a vehicle 8 having a manual transmission system 10, in which the vehicle operator 12 operates a pedal or switch 14, through which a signal representing the state of the switch 14 is transmitted to a controller 16, which manipulates an actuator 18, which controls the engaged, slipping and disengaged states of the input clutch 20. Torque produced by an engine 22, is selectively transmitted through clutch 20 to a manual gearbox/driveline 24 to the driven vehicle wheels 26. The operator manually selects the operating gear of the gearbox 24 by moving a shift lever 28, which moves the shift fork 30 of the synchronizer that corresponds to the selected gear. The selected shift fork produces a drive connection between engine 22 through clutch 20, the selected gear and the transmission output shaft and driveshaft 32 to the driven vehicle wheels 26.

With reference to the clutch pedal and input clutch, as used herein, the clutch is released when the clutch pedal is said to be depressed. The clutch is engaged when the clutch pedal is said to be released. The clutch slips while transmitting torque through frictional force when said to be partly released or partly depressed. So while the clutch pedal is being released (i.e., moving between the depressed clutch pedal position and the released clutch pedal position), the clutch slips.

FIG. 2 shows a vehicle 9 having a manual transmission system 11 according to the present invention. Since the vehicle described in this assembly is similar to the vehicle of FIG. 1, like reference numerals designate corresponding components in the drawings and the detailed description thereof will be omitted. The manual transmission system 11 includes a torque sensor 34. The torque sensor 34 accurately monitors the magnitude of torque and provides a direct torque feedback signal 36 to clutch controller 17. Preferably torque sensor 34 produces a signal representing torque on a shaft between input clutch 20 and the gearbox 24, or on a countershaft of the gearbox 24, or on the output shaft of the gearbox 24, but may be in other locations of the vehicle drive assembly, discussed with reference to FIG. 3.

FIG. 3 schematically illustrates the vehicle drive assembly 148 and where the torque sensor may be located therein, and will be discussed with reference to FIG. 2 also. The engine 22 connects through a crankshaft 150 to the input clutch 20. The clutch 20 may include a flywheel 152 and a clutch plate 154. Additionally, the clutch 20 may include other components such as a torsional damper and a clutch actuator, which are not specifically depicted in FIG. 3. A transmission input shaft 156 connects the clutch 20 to the gearbox/driveline 24. The gearbox/driveline 24 may include a gear set 158 driven by the input shaft 156, which, in turn, drives a transmission output shaft 160. The transmission output shaft 160 may connect to a drive shaft 32, which, in turn, drives a differential 162. The output from the differential 162, of course, drives the wheels 26.

The torque sensor(s) may be located at one or more of the following locations in the vehicle drive assembly. While the torque sensor(s) are shown at multiple locations in FIG. 3, there may be just one torque sensor at one of these locations, or there may be multiple torque sensors at different ones of the illustrated locations that transmit signals to the controller 17, with the controller 17 combining them (through averaging, accounting for a gear ratio between the locations or employing another suitable algorithm) to produce what is employed by the controller 17 as the measured torque for controlling the clutch actuator 18. Having the torque calculated from multiple torque sensors may guard against noises in the measurement, to produce a more robust torque measurement, but, of course, having multiple torque sensors increases the cost of the manual transmission system 11.

The torque sensor 34a may be located adjacent to the crankshaft 150, the torque sensor 34b may be located adjacent to the flywheel 152, the torque sensor 34c may be located adjacent to the transmission input shaft 156, the torque sensor 34d may be located adjacent to a component of the gear set 158, such as, for example a countershaft (not specifically shown). The torque sensor 34e may be located adjacent to the transmission output shaft 160, the torque sensor 34f may be located adjacent to the drive shaft 32, the torque sensor 34g may be located adjacent to a component of the differential 162. At any one (or more) of these locations, the torque sensor may send a feedback signal 36 to the controller 17, which the controller 17 uses to determine actual torque transmitted at the clutch plate 154. The computation of actual torque transmitted through the clutch plate 154 can be achieved by scaling measured torque values with the known gear ratio between the clutch plate 154 and torque sensing location. Alternatively, the computation of actual clutch torque at the clutch plate 154 based on torque measurements at other locations of the vehicle drive assembly may be accomplished, for example, by methods discussed in U.S. Pat. No. 8,510,003, incorporated herein by reference.

The torque sensor 34 employed may be, for example, a magneto-elastic type of torque sensor, such as that disclosed in U.S. Pat. No. 8,510,003, incorporated herein by reference. Other suitable types of torque sensors may be employed instead, if so desired, so long as the sensor can measure the torque at the location in the vehicle drive assembly where it is located. This torque measurement may then be employed in the operation of the manual transmission system 11.

Figure 4:
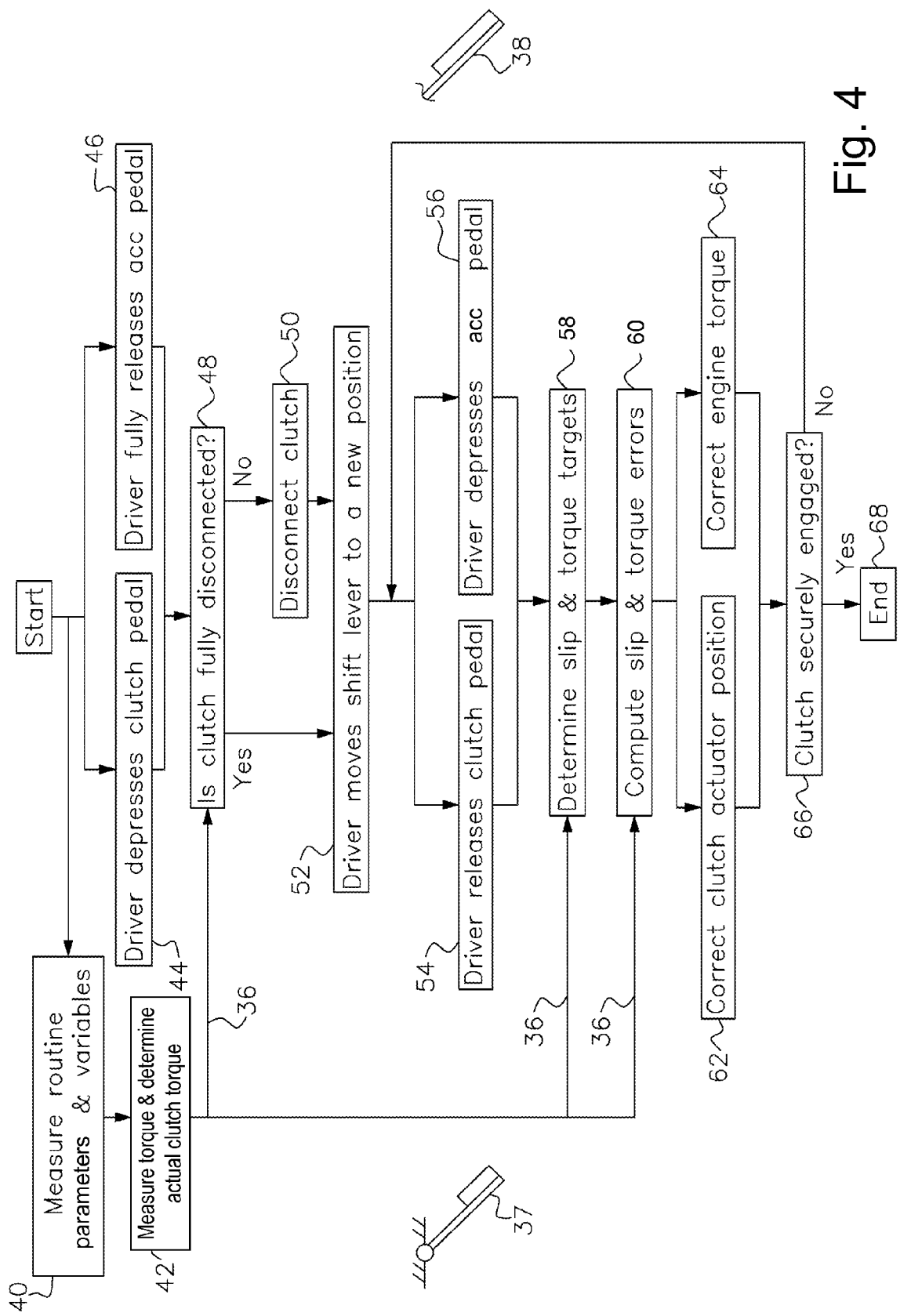
FIG. 4 is a logic diagram representing an algorithm for controlling a gearshift of the manual transmission system of FIG. 2.
Figure 5:
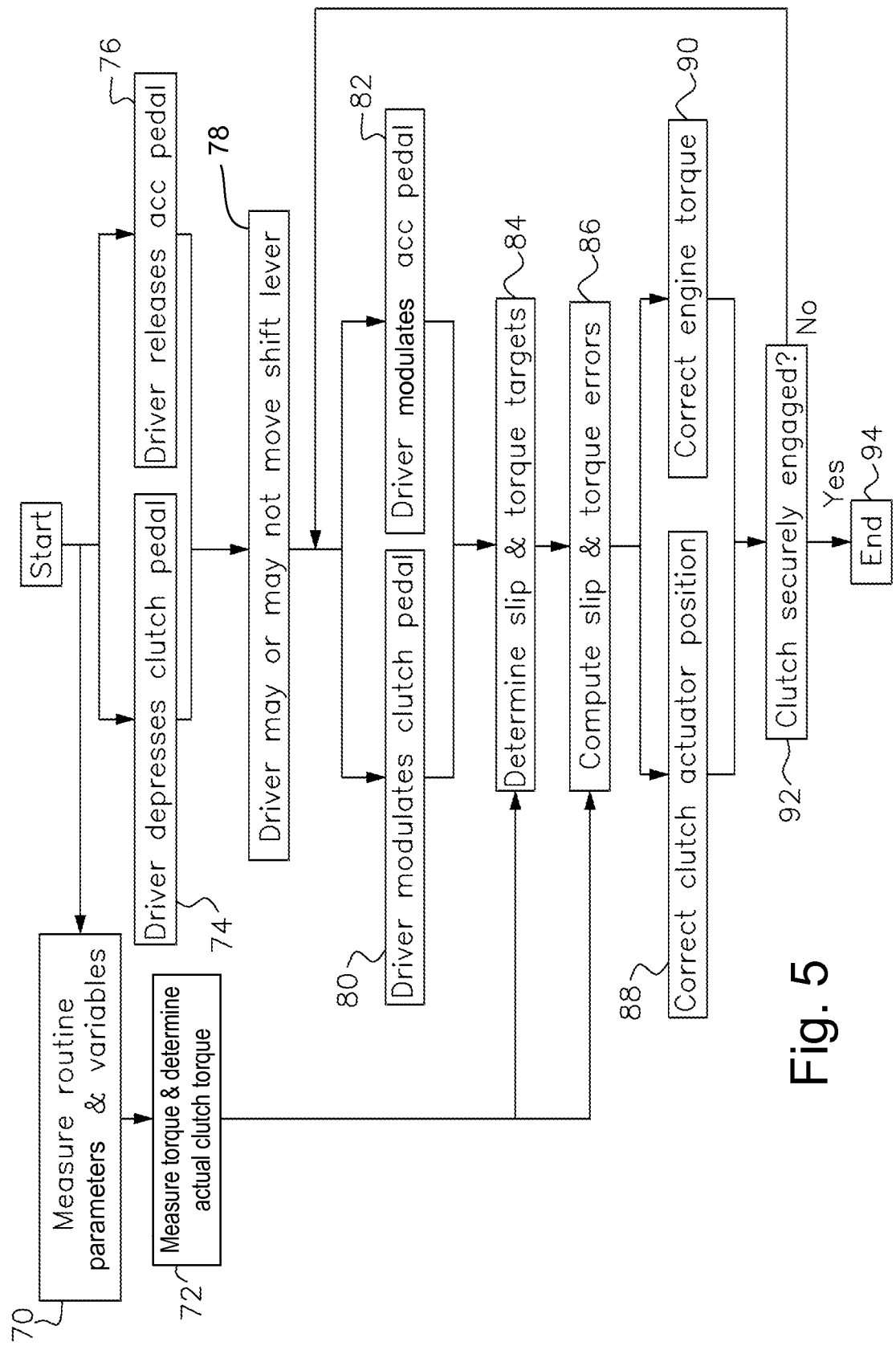
FIG. 5 is a logic diagram representing an algorithm for controlling a input clutch slip of the manual transmission system of FIG. 2.

FIGS. 4 and 5 will now be discussed relative to the vehicle of FIGS. 2 and 3. While a clutch pedal 37 and an accelerator (acc) pedal 38 are shown only in FIG. 4, they are also applicable in the control method of FIG. 5. In the clutch-assist mode illustrated in FIGS. 4 and 5, the vehicle operator (driver) 12 manually operates a clutch pedal 37, accelerator pedal 38 and the gear shift lever 28. The control method automatically corrects clutch operation based on the measured torque signal 36 in order to, for example, prevent undesirable clutch NVH and engine stall conditions.

A clutch-assist mode for shifting gearbox 24 will now be discussed relative to FIG. 4, in view of FIGS. 2 and 3.

At step 40 the state of the transmission such as gear position is identified and routine powertrain parameters and variables, such as vehicle speed, engine throttle position, engine speed and the speed of various shafts are measured.

At step 42 torque is measured by torque sensor 34, and a signal representing that torque magnitude is transmitted to controller 17. The controller 17 uses the torque measurements to compute actual torque transmitted through the input clutch 20, accounting for the gear ratio between the clutch plate location 154 and the torque measurement location At step 44 the operator fully depresses the clutch pedal 37, which controls the state of clutch 20.

At step 46 the operator fully releases the accelerator pedal 38.

At step 48 a test is performed to determine whether clutch 20 is fully disengaged. If the result of test 48 is negative, at step 50 clutch 20 is fully disengaged by controller 17.

At step 52 the operator moves shift lever 28 to the position corresponding to the desired gear to be produced by the gearshift.

At step 54 the operator gradually releases the clutch pedal 37, allowing the clutch to drag (slip), while the operator depresses the accelerator pedal 38, step 56.

At step 58 the controller 17 determines the magnitude of desired clutch slip and desired clutch torque across the slipping clutch 20.

At step 60 controller 17 computes (i) clutch slip error, i.e., the difference between desired clutch slip at step 58 and clutch slip represented by differential speed across clutch 20 as measured at step 40; and (ii) clutch torque error, i.e., the difference between actual clutch torque at step 42 and desired clutch torque at step 58. A deviation of actual clutch torque from the desired level may be caused by operator's clutch pedal control error or may be due to undesirable clutch frictional behaviors such as stick-slip.

At step 62 controller 17 corrects the position of the clutch actuator 18 on the basis of clutch torque error and slip error, such that the errors are reduced, minimized or eliminated.

At step 64 controller 17 corrects engine torque such that the adjusted engine torque augments clutch actuator control 62 to reduce, minimize or eliminate clutch torque and slip error and such that engine torque is compatible with the current diving conditions: vehicle speed, throttle position and the newly engaged gear.

At step 66 a test is performed to determine whether clutch 20 is fully engaged. If the result of test 66 is negative, control returns to steps 54 and 56.

If the result of test 66 is positive, control of clutch-assist mode shifting ends at 68.

A clutch-assist mode for controlling slip of clutch 20 will now be discussed with reference to FIG. 5, in view of FIGS. 2 and 3.

At step 70 the state of the transmission such as gear position is identified and routine powertrain parameters and variables, such as vehicle speed, engine throttle position, engine speed and the speed of various shafts are measured.

At step 72 torque is measured by torque sensor 34, and a signal representing that torque magnitude is transmitted to controller 17. The controller 17 uses torque measurements to determine actual torque transmitted through the input clutch 20, accounting for the gear ratio between the clutch plate location 154 and the torque measurement location.

At step 74 the operator (driver) depresses the clutch pedal 37, which controls the state of clutch 20, and releases the accelerator pedal 38 at step 76.

At step 78 the operator may (or may not) move the shift lever 28 to the position corresponding to the desired gear.

At step 80 the operator modulates the clutch pedal 37, allowing the clutch to slip while transmitting torque through frictional force.

At step 82 the operator modulates the accelerator pedal 38.

At step 84 controller 17 determines the magnitude of desired clutch slip across clutch 20, the desired clutch torque capacity of the given vehicle condition determined at 70.

At step 86 controller 17 computes (i) clutch slip error, i.e., the difference between desired clutch slip at step 84 and clutch slip represented by differential speed across clutch 20 as measured at step 70; and (ii) clutch torque error, i.e., the difference between desired clutch torque capacity at step 84 and actual clutch torque capacity determined at step 72.

At step 88 controller 17 corrects the position of the clutch actuator 18 on the basis of clutch slip error and clutch torque error, such that the errors are reduced, minimized or eliminated.

At step 90 controller 17 corrects engine torque such that the adjusted engine torque augments clutch actuator control 88 to reduce, minimize or eliminate clutch torque and slip error and such that engine torque is compatible with the current diving conditions, including vehicle speed, throttle position and gear position.

At step 92 a test is performed to determine whether clutch 20 is fully engaged. If the result of test 92 is negative, control returns to steps 80 and 82.

If the result of test 92 is positive, control of clutch-assist mode slipping ends at 94.

Figure 6:
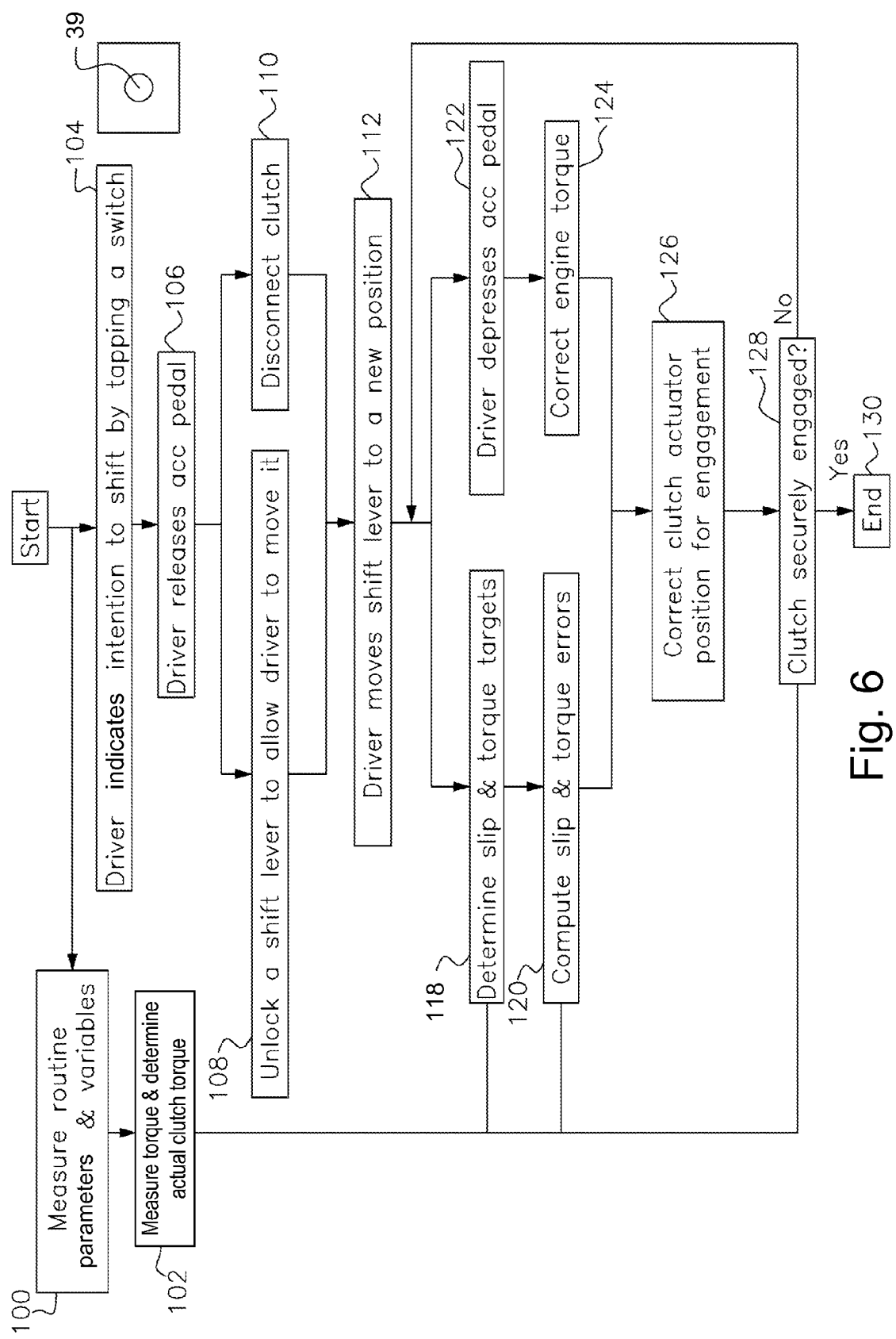
FIG. 6 is a logic diagram representing an algorithm for controlling a gearshift of the manual transmission system of FIG. 2.

An auto-clutch mode for controlling shifting will now be discussed with reference to FIG. 6, in view of FIGS. 2 and 3. The control method (i) opens clutch 20 when the vehicle operator (driver) indicates a desire to produce a gear shift by pressing a hand-actuated button, a foot-actuated switch 39 or any other similar pre-defined means; and (ii) closes or engages clutch 20 after the driver moves the shift lever 28 to the selected gear position. The clutch torque-based control method adjusts the position of clutch actuator 18 to maintain smooth torque transition during the release and engagement of clutch 20. This vehicle shift operation occurs without requiring a driver to manually operate a clutch pedal.

At step 100 the state of the transmission such as gear position is identified and routine powertrain parameters and variables, such as vehicle speed, engine throttle position, engine speed and the speed of various shafts are measured.

At step 102 torque is measured by torque sensor 34, and a signal representing that torque magnitude is transmitted to controller 17. The controller 17 uses torque measurements to determine actual torque transmitted through the input clutch 20, accounting for the gear ratio between the clutch plate location 154 and torque sensor location.

At step 104 the operator indicates a desire for a gear shift by actuating switch 39, though which a signal is transmitted to controller 17.

At step 106 the operator releases the accelerator pedal 38.

At step 108 controller 17 unlocks shift lever 28, thereby allowing the operator to move the shift lever, while the controller 17 activates the clutch actuator 18 to disengage clutch 20, step 110.

At step 112 the operator moves shift lever 28 to the position corresponding to the desired gear to be produced by the gearshift.

At step 118 the controller 17 determines the magnitude of desired clutch slip across clutch 20 and the desired clutch torque given the vehicle conditions determined at 100.

At step 120 controller 17 computes (i) clutch slip error, i.e., the difference between desired clutch slip at step 118 and clutch slip represented by differential speed across clutch 20 as measured at step 100; and (ii) clutch torque error, i.e., the difference between desired clutch torque capacity at step 118 and actual clutch torque capacity determined at step 102.

At step 122 the operator depresses accelerator pedal 38.

At step 124 controller 17 corrects engine torque such that engine torque is compatible with actual clutch torque capacity and the current diving conditions, including vehicle speed, throttle position and the newly engaged gear. For example, if the engine torque significantly exceeds clutch torque capacity, engine speed excursion or flare may occur. If the engine torque is significantly smaller than clutch torque, engine stall may occur.

At step 126 the controller 17 corrects the position of clutch actuator 18 such that clutch slip error and clutch torque error are reduced, minimized or eliminated.

At step 128 the controller 17 performs a test to determine whether clutch 20 is fully engaged. If the result of test 128 is negative, control returns to steps 118 and 122.

If the result of test 128 is positive, control of auto-clutch mode shifting ends at 130.

In accordance with the provisions of the patent statutes, the preferred embodiment has been described. However, it should be noted that the alternate embodiments can be practiced otherwise than as specifically illustrated and described.

The invention claimed is:

1. A method for controlling a manual transmission gearshift, comprising:
   (a) using a controller to determine a desired clutch torque transmitted through a transmission input clutch for a desired gear after a shift lever is moved to a desired gear position and while a clutch pedal is being released;
   (b) measuring torque in a vehicle drive assembly;
   (c) using the measured torque to determine actual torque transmitted through the clutch as the clutch slips;
   (d) reducing clutch torque error using the controller to adjust a clutch actuator such that a difference between the desired clutch torque and the actual clutch torque is reduced.

2. The method of claim 1, further comprising:
   (e) determining a current engine torque;
   (f) using the controller to determine a desired engine torque for the desired gear; and
   (g) using the controller to reduce a difference between the desired engine torque and the current engine torque.

3. The method of claim 1, further comprising using the controller to reengage the clutch.

4. The method of claim 1, wherein step (a) further comprises using the controller to determine the desired clutch torque for the desired gear after an accelerator pedal is redepressed.

5. The method of claim 1 further comprising the steps of:
   (e) using the controller to determine a desired clutch slip of the clutch;
   (f) measuring slip across the clutch; and
   (g) reducing clutch slip error using the controller to adjust the clutch actuator such that a difference between the desired clutch slip and the measured slip is reduced.

6. The method of claim 1 wherein step (b) is further defined by the torque being measured by a torque sensor in a manual transmission.

7. The method of claim 1 wherein step (b) is further defined by the torque being measured by a torque sensor located between an engine and a manual transmission.

8. The method of claim 1 wherein step (b) is further defined by the torque being measured by a torque sensor being located between a manual transmission and a driven wheel.

9. A method for controlling a manual transmission gearshift, comprising:
 (a) using a controller to determine a desired clutch torque transmitted through a transmission input clutch for a desired gear, after a shift lever is in a desired gear position for a gearshift, a clutch pedal is depressed and thereafter released, and an accelerator pedal is released and thereafter depressed;
 (b) measuring torque in at least one location in a vehicle drive assembly;
 (c) using the measured torque to determine actual torque transmitted through the clutch;
 (d) reducing clutch torque error using the controller to adjust a clutch actuator such that a difference between the desired clutch torque and the actual clutch torque is reduced.

10. The method of claim 9, further comprising:
 determining a current engine torque;
 using the controller to determine a desired engine torque for the desired gear; and
 using the controller to reduce a difference between the desired engine torque and the current engine torque.

11. The method of claim 9, further comprising using the controller to reengage the clutch.

12. The method of claim 9 further comprising the steps of:
 (e) using the controller to determine a desired clutch slip of the clutch;
 (f) measuring slip across the clutch; and
 (g) reducing clutch slip error using the controller to adjust the clutch actuator such that a difference between the desired clutch slip and the measured slip is reduced.

13. A method for controlling a manual transmission gearshift, comprising:
 (a) using a controller to unlock a shift lever after a switch state indicates a gearshift is desired and an accelerator pedal is released;
 (b) after the shift lever is moved to a new gear position, using the controller to determine a desired clutch torque transmitted through a transmission input clutch for the new gear position;
 (c) measuring torque in at least one location in a vehicle drive assembly;
 (d) using the measured torque to determine actual torque transmitted through the clutch;
 (e) reducing torque error using the controller to adjust a clutch actuator such that a difference between the desired clutch torque and the actual clutch torque is reduced.

14. The method of claim 13, further comprising:
 determining a current engine torque;
 using the controller to determine a desired engine torque for the new gear position; and
 using the controller to reduce a difference between the desired engine torque and the current engine torque.

15. The method of claim 13, further comprising using the controller to reengage the clutch.

16. The method of claim 13, wherein step (a) further comprises using the controller to determine the desired clutch torque for the new gear position after an accelerator pedal is redepressed.

17. The method of claim 13 further comprising the steps of:
 (e) using the controller to determine a desired clutch slip of the clutch;
 (f) measuring slip across the clutch; and
 (g) reducing clutch slip error using the controller to adjust the clutch actuator such that a difference between the desired clutch slip and the measured slip is reduced.

* * * * *